May 23, 1933.  J. B. HENDERSON  1,910,287
PHOTOGRAPHIC FILM ROLL
Filed Dec. 3, 1932
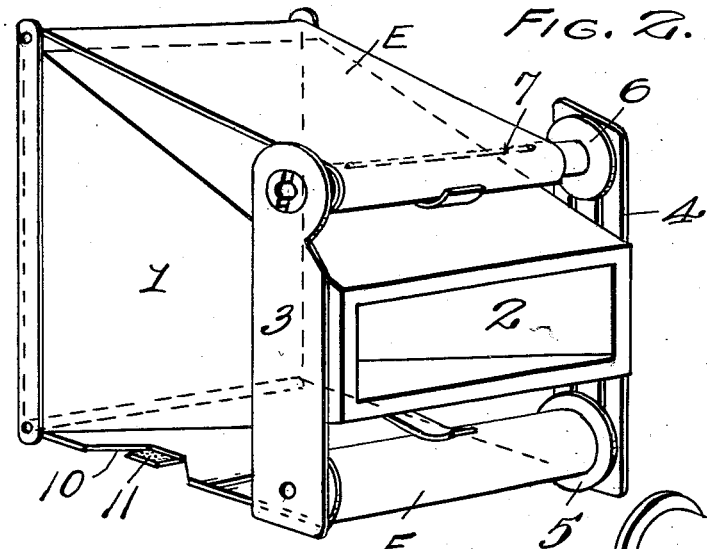
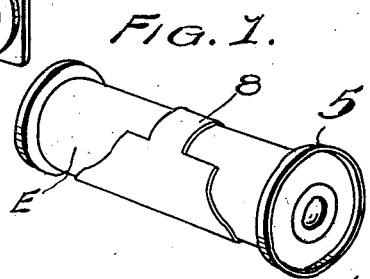
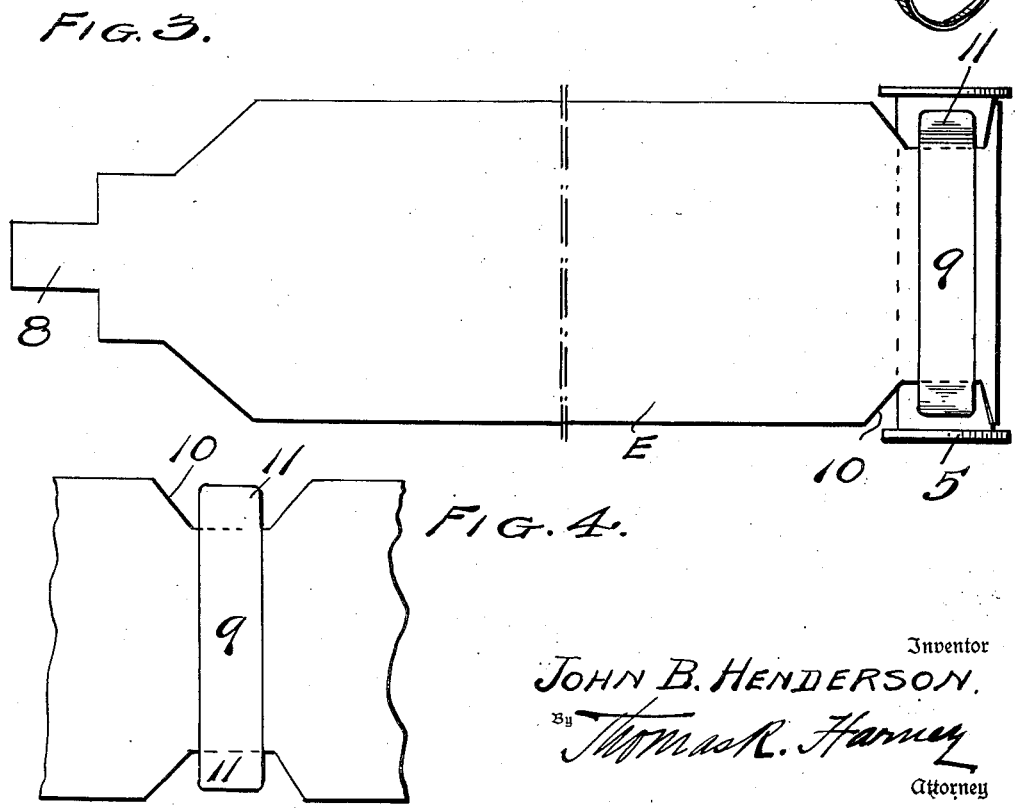
Inventor
JOHN B. HENDERSON.
By Thomas R. Harney
Attorney Patented May 23, 1933

1,910,287

UNITED STATES PATENT OFFICE

JOHN B. HENDERSON, OF WASHINGTON, DISTRICT OF COLUMBIA, ASSIGNOR OF ONE-FOURTH TO ABRAHAM T. FINKELSTEIN, AND ONE-FOURTH TO JULIUS F. PASTERNAK, BOTH OF WASHINGTON, DISTRICT OF COLUMBIA

PHOTOGRAPHIC FILM-ROLL

Application filed December 3, 1932. Serial No. 645,608.

My present invention relates to improvements in photographic film-rolls for use in cameras, moving picture apparatus, and similar appliances employing a sealed roll of this nature that is to be exposed within the interior of an enclosure. For convenience of illustration and description, I have herewith illustrated and described the film-roll in connection with a well known type of portable camera, which camera is "loaded" with a film-roll in well known manner, and after successive exposures of the film within the camera, and usual re-rolling or winding of the exposed film within the camera, the finished roll is removed for developing. The primary object of my invention is to protect the film against exposure at all times, except and after the film has been properly "loaded" and is ready for exposure within the interior of the camera or other apparatus.

As is well known, the usual photogaphic film is sealed against uncoiling or unwrapping by means of a sealing tab at the outer end of the paper extension, which forms a wrapper at the end of the photographic film. When the sealed film is to be loaded in the camera for use, this fastening tab is released or detached, the spool of the film-roll is mounted in the magazine, and the free end of the paper extension or wrapper is inserted in the usual slot of the take-up roll of the camera, after which the film is successively exposed and re-wound on the take-up spool. Should the usual, unfastened or unsealed, film-roll be accidentally dropped from the hands before it can be loaded in the camera, the film thus freed immediately uncoils or unwraps, and as a consequence when the film is thus exposed to the light, the film is ruined and of no further use. Thus it will be apparent that the photographic films now in use, if accidentally unwrapped or uncoiled before loading in the camera, are likely to be ruined, but when the principles of my invention are embodied in the usual or standard film, the danger of this accidental exposure of the film is eliminated.

In carrying out my invention, in addition to the usual or customary sealing tab at the end of the film or its extension-wrapper, I employ means to accomplish a second sealing of the film-roll, and this means is spaced a suitable distance, (depending on the length of the roll, the size of the spool, etc.), from the outer end-sealing tab, in order that the second seal may prevent unrolling of the film-section, even though the extension or the paper-wrapper, may accidentally be unrolled or unwrapped. Under correct practice in the use of my improved film-roll, the second seal is broken only after the film-roll has been enclosed within the camera and the film is ready for exposure in the camera.

In the accompanying drawing, I have illustrated one complete example of the physical embodiment of my invention for use with a well known type of camera, but it will be understood that the improved film-roll may be employed with other similar apparatus, and that changes and alterations may be made in the exemplified structure, within the scope of my claim without departing from the principles of my invention.

Figure 1 is a perspective view of a photographic film-roll embodying my invention;

Fig. 2 is a perspective view of the magazine portion of a well known type of camera showing the film, just after the second seal has been broken with the film ready to be drawn to exposure position;

Fig. 3 is a plan view of a film-roll with the wrapper unfastened in usual manner, but with the improvement of my invention functioning to prevent exposure of the film; and Fig. 4 is a fragmentary view of the paper wrapper showing my sealing device thereon.

In order that the general arrangement and relation of parts may readily be understood, I have shown in Figure 2 the magazine 1 removed from a camera, indicating the front open end 2, and the two side plates 3 and 4, in which the film spool 5 and the take-up spool 6 are journaled, and the take-up spool is rotated in usual manner. The usual slot 7 is indicated by dotted lines in the take-up spool 6, and the end of the extension E, or paper-wrapper, is inserted in this slot after the tab 8 has been unsealed and, as is customary, torn from the end of the paper extension E.

The paper extension E is secured to the film F in usual manner, and the tab 8, as usual, is secured, as by an adhesive to the wrapped extension E, as indicated in Figure 1. As is customary, the tab 8 in Figure 1 is unfastened, the spool 5 with its roll thereon is placed between the two lower journal-ends of the plates 3 and 4; the free end of the paper wrapper or extension E is carried around the rear end of the magazine, fastened to the slotted spool 6, and the latter is then wound or rotated to wind the wrapper and film thereon. In Figure 2, the spool 6 has been rotated to wind the wrapper or extension, but the film F has not yet been brought to the position of the first exposure. The second seal, however, has been broken, automatically, within the camera, by the preliminary winding of the take-up spool 6.

The second seal, as herein disclosed, is located at a suitable distance from the outer free end of the roll, or at a distance from the outer free end of the extension E of the film, which extension forms the wrapper, as in Figure 1, of the film-roll. As one exemplification of the seal, I have indicated a sealing strip 9 that may form a part of, or is secured to the paper extension. This strip extends transverse of the paper extension, and the latter is notched at its opposite sides, as at 10, 10, in order that the projecting ends 11 of the strip 9 may form attaching tabs. As indicated in Figure 2, the inner faces of these tabs are provided with a suitable adhesive means, so that the tabs, when the film-roll is in wrapped condition, are stuck to the coil or layer of the extension that is within the notched layer of the wrapper. Thus, as indicated in Figure 3, after the tab 8 has been unfastened from the roll (Figure 1) the end of the wrapper or extension E may be uncoiled or unwrapped from the film-roll, but when the unwrapping process reaches the point that uncovers the sealing strip 9, it will be found that the balance of the film-roll is sealed against unwrapping. Thus, even though the wrapper, or most of it, has been unrolled from the film-roll in Figure 3, the film portion of the roll is not exposed, and cannot, without force, be unrolled, because of the sealing tabs 11, 11 of the wrapper that are adhering to the adjoining layer of the extension beneath this notched part of the extension or wrapper.

These adhering ends or seals are located near the inner end of the wrapper or extension, adjacent the junction of the extension and the film F, and they are broken or unfastened, only while the film is loaded within the camera. Thus, in Figure 1, where it will be understood the magazine is enclosed within the camera, the take-up roll or spool 6 has been rotated to wind the wrapper or extension from the spool 5, and the tabs 11 have been detached from the roll or spool 6, and thereby uncovered the film F. The tabs 11 are detached from the extension as the spool 5 revolves, and the noise of the breaking of the seal may be heard by the operator of the camera as he turns the usual key for winding the wrapper on the take-up spool 6. By the breaking sound of the seal, the operator is notified that the seal is broken and that the film is about to be unwound from the magazine spool 5, and is therefore prepared for the first exposure.

The usual directions, and the usual numbers designating the exposures, are printed on the paper backing of the film, and while I have referred to the extension or wrapper E as distinguished from the film F, it will be understood that the entire roll-strip is the usual film with the usual paper back, except to the improvements I have thus embodied in the photographic film-roll by the use of my invention.

While I have shown a cross strip 9 attached to the backing, or paper side of the film, it will be understood that means other than the projecting, adhesive tabs 11 may be utilized for securing the wrapper or extension portion E on the film-roll, and such modifications of the sealing means I consider as covered by my appended claim.

Having thus fully described my invention, what I claim as new and desire to secure by Letters Patent is—

A photographic film-roll having an outer-wrapper-portion, and means for fastening the free end of said wrapper-portion, said wrapper-portion having lateral notches, a cross strip secured to the wrapper-portion between said notches, and the projecting ends of said strip forming adhesive tabs sealed to the outer layer of the wrapper-portion beneath said tabs to prevent accidental exposure of the film after the free end is unwrapped.

In testimony whereof, I have affixed my signature.

JOHN B. HENDERSON.